G. D. EDMONDSON.
Frame for Spectacles and Eye-Glasses.

No. 206,306.   Patented July 23, 1878.

UNITED STATES PATENT OFFICE.

GEORGE D. EDMONDSON, OF DETROIT, MICHIGAN.

IMPROVEMENT IN FRAMES FOR SPECTACLES AND EYEGLASSES.

Specification forming part of Letters Patent No. 206,306, dated July 23, 1878; application filed April 13, 1878.

*To all whom it may concern:*

Be it known that I, GEORGE D. EDMONDSON, of Detroit, in the county of Wayne and State of Michigan, have invented an Improvement in Spectacles and Eyeglasses, of which the following is a specification:

The nature of my invention relates to new and useful improvements in the manufacture of spectacles and eyeglasses; and the invention consists in the peculiar construction of the frames and their combination with glasses or lenses channeled or grooved around their outer edges, as more fully hereinafter described.

Figure 1:
Figure 2:
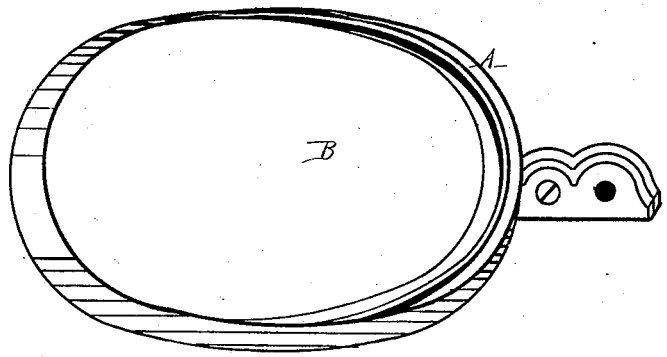
Figure 3:
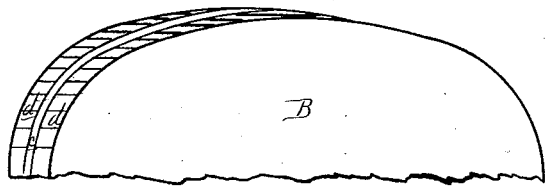

Figure 1 is an exaggerated transverse section, showing the locking-rib and holding or binding surface of the frame. Fig. 2 is an enlarged perspective view of my improved frame. Fig. 3 is a perspective view of a glass or lens adapted to be used with my improved frame.

In the accompanying drawings, which form a part of this specification, A represents a frame made of any desired material and form, provided with an interiorly-projecting rib, $a$, midway between the two binding-surfaces $b$. The edge of the glass or lens B is provided with a groove or channel, $c$, preferably larger than the rib $a$ of the frame, so that when the lens is in place in the frame the rib, entering said groove, will prevent the glass from being accidentally displaced, and the parts so arranged that the surfaces $b$ of the frame will bind upon the corresponding surfaces $d$ on each side of the groove of the lens without allowing the rib to bind upon the bottom of the groove, which would have a tendency to split or chip the edge of the glass. The rib is only designed to prevent the glass from being displaced by lateral pressure, while I depend upon the bearing or binding surfaces $b\ d$ to secure the frame to the glass.

I am aware that glasses or lenses have been provided with grooves or channels which have been used with a frame fitting into such grooves; but these are not my invention; neither do I desire to use such frames as depend upon their engagement with such grooves to hold the glasses, as they are apt, if the frames are drawn too tightly, to split or chip the glasses at the grooves, and do not afford any protection to the edges of the lenses on either side of the grooves.

What I claim as my invention, and desire to secure by Letters Patent, is—

The improved spectacles or eyeglasses herein described, wherein the frames A are provided with ribs $a$ and bearing and binding surfaces $b$, and are combined with the lenses provided with grooves $c$ and surfaces $d$, substantially as and for the purposes set forth.

GEORGE D. EDMONDSON.

Witnesses:
 H. S. SPRAGUE,
 PETER E. DE MILL, Jr.